(12) United States Patent
Liao et al.

(10) Patent No.: US 9,629,214 B2
(45) Date of Patent: Apr. 18, 2017

(54) BACKLIGHT CONTROL CIRCUIT WITH FLEXIBLE CONFIGURATION

(71) Applicant: RICHTEK TECHNOLOGY CORPORATION, Chupei, Hsin-Chu (TW)

(72) Inventors: Chiawei Liao, San Jose, CA (US); Jing-Meng Liu, Jubei (TW)

(73) Assignee: RICHTEK TECHNOLOGY CORPORATION, Chupei, Hsin-Chu (TW)

( * ) Notice: Subject to any disclaimer, the term of this patent is extended or adjusted under 35 U.S.C. 154(b) by 27 days.

(21) Appl. No.: 14/718,045

(22) Filed: May 20, 2015

(65) Prior Publication Data

US 2015/0257228 A1   Sep. 10, 2015

Related U.S. Application Data

(63) Continuation of application No. 12/008,798, filed on Jan. 14, 2008, now Pat. No. 9,072,137.

(30) Foreign Application Priority Data

Jan. 31, 2007   (TW) .............................. 96103557 A (51) Int. Cl.
   *H05B 33/00*   (2006.01)
   *H05B 33/08*   (2006.01)
   *G09G 3/34*    (2006.01)

(52) U.S. Cl.
   CPC ....... *H05B 33/0845* (2013.01); *H05B 33/089* (2013.01); *H05B 33/0812* (2013.01); *H05B 33/0827* (2013.01); *G09G 3/3406* (2013.01); *G09G 2330/04* (2013.01); *Y02B 20/345* (2013.01)

(58) Field of Classification Search
   CPC ............ H05B 33/0815; H05B 33/0827; H05B 33/0821; H05B 33/0854; H05B 33/089; Y02B 20/347; H02J 7/0003; H02J 7/0004; H02J 7/0011; H02J 9/061; H02J 7/0072
   See application file for complete search history.

(56) References Cited

U.S. PATENT DOCUMENTS

| 6,466,188 | B1 * | 10/2002 | Cato | H05B 33/0815 345/102 |
| 2005/0007085 | A1 * | 1/2005 | Murakami | H05B 33/0815 323/282 |
| 2005/0104542 | A1 * | 5/2005 | Ito | H05B 33/0815 315/291 |
| 2006/0022918 | A1 * | 2/2006 | Tang | H05B 33/0821 345/84 |

(Continued)

*Primary Examiner* — Monica C King
(74) *Attorney, Agent, or Firm* — Tung & Associates (57) ABSTRACT

The present invention discloses a backlight control circuit with flexible configuration, comprising: a light emitting device path; a current source for controlling the current amount on the light emitting device path, the current source receiving a relatively high reference voltage in a first state, and receiving a relatively low reference voltage in a second state; and a current source control circuit for controlling the current source, whereby when the light emitting device path is in normal use, the current source is set to the first state, and when the light emitting device path is not in normal use, the current source is set to the second state.

14 Claims, 7 Drawing Sheets

(56) References Cited

U.S. PATENT DOCUMENTS

| | | | | |
|---|---|---|---|---|
| 2006/0256050 A1* | 11/2006 | Ikeda | ............ | H05B 33/0827 345/82 |
| 2007/0008665 A1* | 1/2007 | Moyer | ............ | H02H 3/05 361/42 |
| 2007/0170874 A1* | 7/2007 | Kunimatsu | ............ | H05B 33/0815 315/291 |
| 2007/0170876 A1* | 7/2007 | Ito | ............ | H05B 33/0893 315/312 |
| 2009/0134817 A1* | 5/2009 | Jurngwirth | ............ | H05B 33/0851 315/307 |

* cited by examiner

BACKLIGHT CONTROL CIRCUIT WITH FLEXIBLE CONFIGURATION

CROSS REFERENCE

The present application is a continuation application of U.S. Ser. No. 12/008,798, filed on Jan. 14, 2008.

FIELD OF INVENTION

The present invention relates to a backlight control circuit. More particularly, the present invention relates to a backlight control circuit with flexible pin configuration for excess pins not to be connected to light emitting devices.

DESCRIPTION OF RELATED ART

In a liquid crystal display (LCD), a backlight control circuit is used which controls LEDs to illuminate from the back side of an LCD screen, so that a user can observe an image from the front side of the LCD screen.

Figure 1:
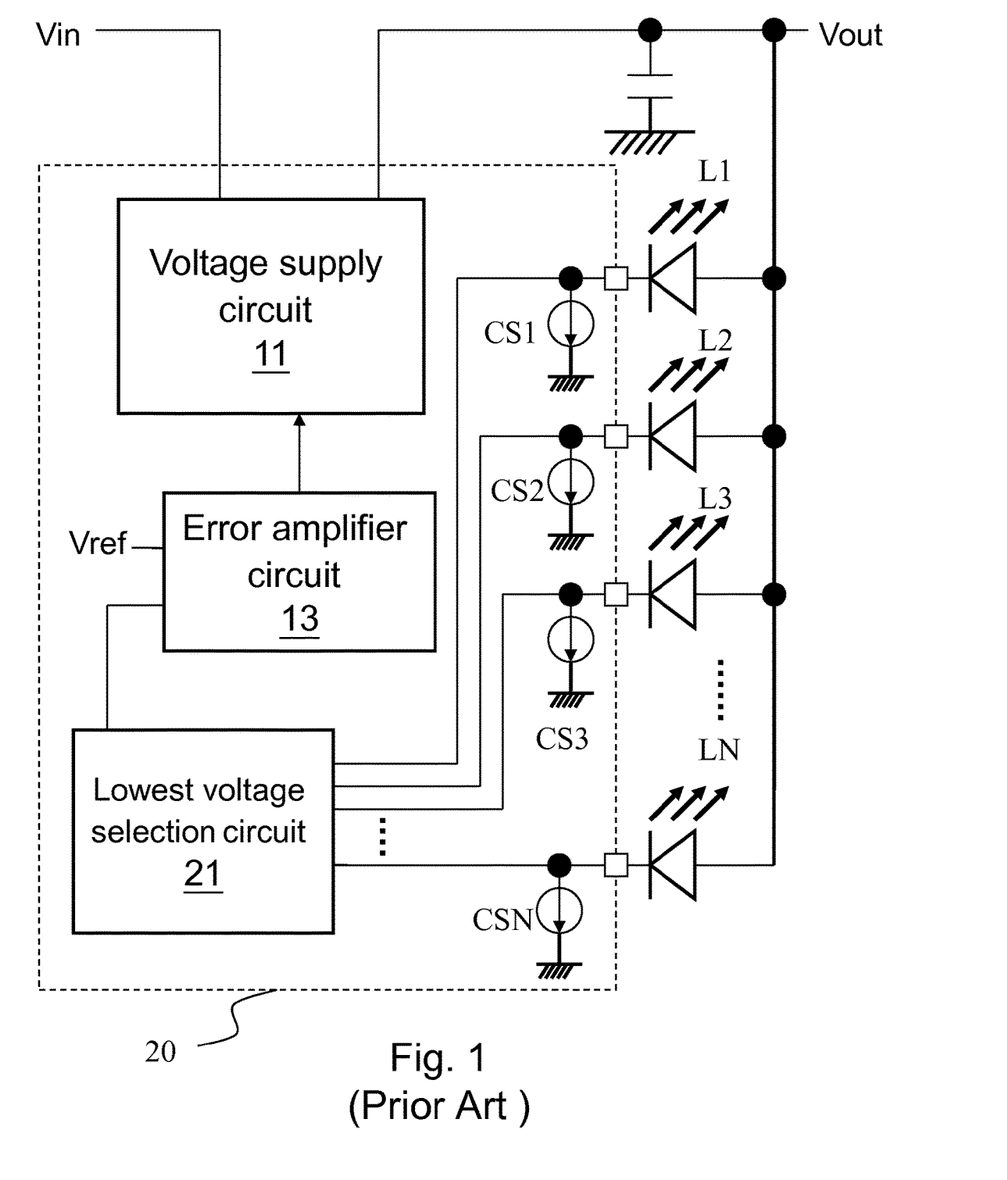
FIG. 1 is a schematic circuit diagram showing a prior art circuit including LEDs which are all connected in parallel and a backlight control circuit thereof.

In early days, LED backlight is used only in a small size screen, which does not require high backlight brightness. Therefore, the LEDs can be connected all in series or all in parallel. FIG. 1 shows a prior art circuit wherein all LEDs are connected in parallel. As shown in the figure, a backlight control circuit 20 comprises a plurality of current sources CS1-CSN for respectively controlling currents passing through the LEDs L1-LN. The backlight control circuit 20 comprises a lowest voltage selection circuit 21 to select a lowest voltage among all cathode ends of the LEDs L1-LN. The selected lowest voltage is compared with a reference voltage Vref, to thereby control a voltage supply circuit 11. The output voltage Vout from the voltage supply circuit 11 is thus controlled so that all current sources are provided with sufficient operating voltage for normal operation, and all LEDs can illuminate normally thereby.

Figure 2:
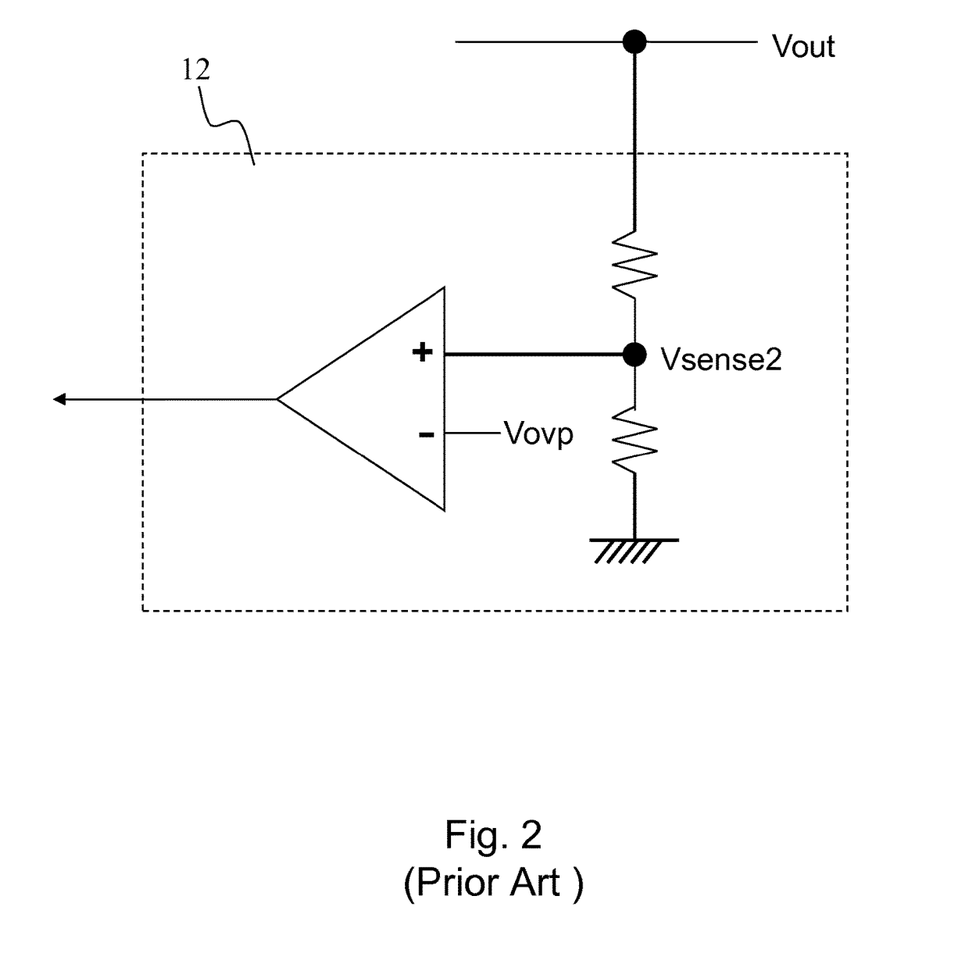
FIG. 2 is a schematic circuit diagram showing a conventional over voltage protection circuit.

The backlight control circuit 20 may further comprise an over voltage protection circuit to prevent the output voltage Vout from increasing unlimitedly. FIG. 2 shows a typical structure of an over voltage protection circuit 12, wherein the output voltage Vout is monitored by comparing the voltage at the node Vsense2 with a reference voltage Vovp. The result of comparison determines a signal for controlling the voltage supply circuit 11.

Because the backlight control circuit 20 is an integrated circuit, the number of its pins (shown by hollow squares in FIG. 1) is fixed. When the number of pins is larger than the number of LED strings to be connected with, prior art suggests connecting the excess pins to the output voltage Vout. An excess pin can not be left floating or grounded; otherwise the lowest voltage selection circuit 21 will select the input corresponding to it and keep increasing the output voltage Vout. By connecting the excess pin to the output voltage Vout, it can be sure that the lowest voltage selection circuit 21 will not select the input corresponding to the excess pin.

Figure 3:
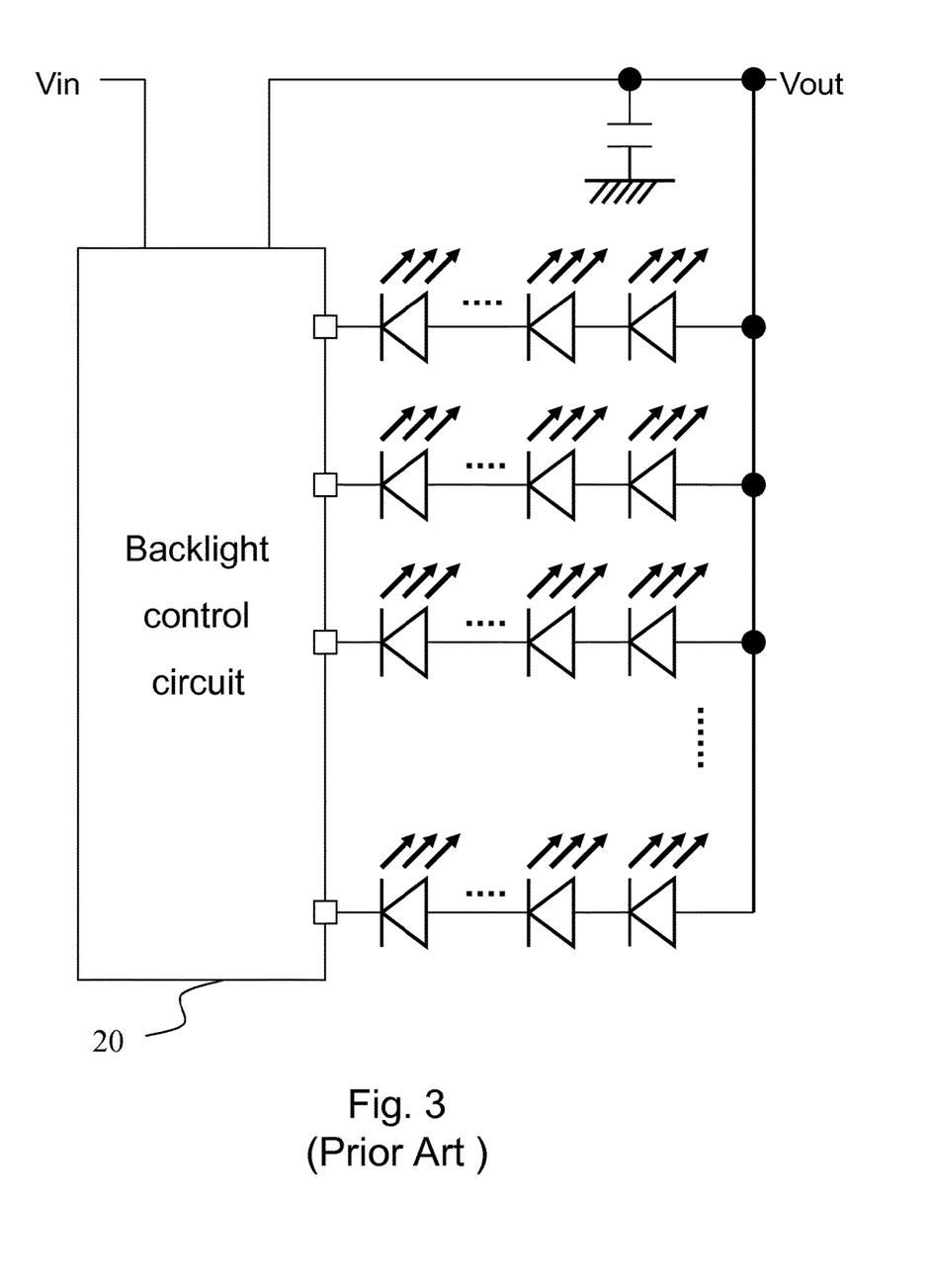
FIG. 3 is a schematic circuit diagram showing a prior art circuit including LEDs which are connected partially in series and partially in parallel, and a backlight control circuit thereof.

As the size of an LCD screen increases, the requirement for backlight brightness increases, and the number of LEDs correspondingly increases. Under such circumstance, it is impossible to connect all the LEDs in parallel; they have to be connected partially in series and partially in parallel, as shown in FIG. 3. In this case, the required output voltage Vout is much higher than that in FIG. 1; for example, the output voltage Vout in FIG. 1 may be around 5V, while the output voltage Vout in FIG. 3 may be as high as 60V. Accordingly, if any pin becomes an excess pin that has to be connected to the output voltage Vout, the device inside the integrated circuit in connection with the pin has to be a costly high voltage device. In addition, the electro-static damage issue will become worse, and the internal circuit will unnecessarily consume huge power and generate heat. The prior art of either FIG. 1 or 3 does not disclose any solution to the above-mentioned problem. Besides, it is inconvenient and not flexible in many occasions if an excess pin has to be connected to the output voltage Vout.

SUMMARY

In view of the foregoing, it is an objective of the present invention to provide a backlight control circuit with flexible configuration, in which excess pins not to be connected to light emitting devices can be arranged in many ways, to resolve the above-mentioned problems.

More specifically, when a pin is not to be connected to light emitting devices, it can be connected to any feasible voltage, not necessarily the output voltage from the backlight control circuit. For example, the "feasible voltage" may be the input voltage of the backlight control circuit. Moreover, even if the excess pin is connected to the output voltage, the present invention is capable of controlling the circuit devices connected with the excess pins to reduce power consumption.

Another objective of the present invention is to provide a current control method for a light emitting device path.

In accordance with the foregoing and other objectives of the present invention, and from one aspect of the present invention, a backlight control circuit with flexible configuration comprises: a light emitting device path; a current source for controlling the current amount on the light emitting device path, the current source receiving a relatively high reference voltage in a first state, and receiving a relatively low reference voltage in a second state; and a current source control circuit for controlling the current source, whereby when the light emitting device path is in normal use, the current source is set to the first state, and when the light emitting device path is not in normal use, the current source is set to the second state.

The relatively low reference voltage in the above is preferably equal to or higher than zero volt.

The current source control circuit preferably includes a comparator circuit, and a selection circuit, and more preferably further includes a logic circuit.

From another aspect, the present invention discloses a backlight control circuit with a flexible configuration, which comprises: a light emitting device path; a current source, controlling a current amount on the light emitting device path, wherein the current source provides a relatively high current when the current source is in a first state, and provides a relatively low current when the current source is in a second state; and a current source control circuit, setting the current source to the first state when the light emitting device path is in normal use, and setting the current source to the second state when the light emitting device path is not in normal use.

The relatively low reference voltage in the above is preferably equal to or higher than zero volt.

The current source control circuit preferably includes a comparator circuit, and a selection circuit, and more preferably further includes a logic circuit.

From yet another aspect of the present invention, a method for controlling a current in a light emitting device path comprises: providing a light emitting device path; detecting the state of the light emitting device path; and conducting a relatively high current on the light emitting device path in a first state, and conducting a relatively low or no current on the light emitting device path in a second state.

In the above method, the result of detection is preferably shielded during circuit initialization, power recovery, or periodic check.

Preferably, a relatively low current is provided on the light emitting device path when the state of the light emitting device path is not determined; a relatively high current is provided on the light emitting device path when the light emitting device path is in the first state; and conducting a relatively low or no current is provided on the light emitting device path when the light emitting device path is in the second state.

The foregoing general descriptions and the following detailed embodiments are provided to make these and other features, aspects, functions and advantages of the present invention better understood.

DESCRIPTION OF THE PREFERRED EMBODIMENTS

Figure 4:
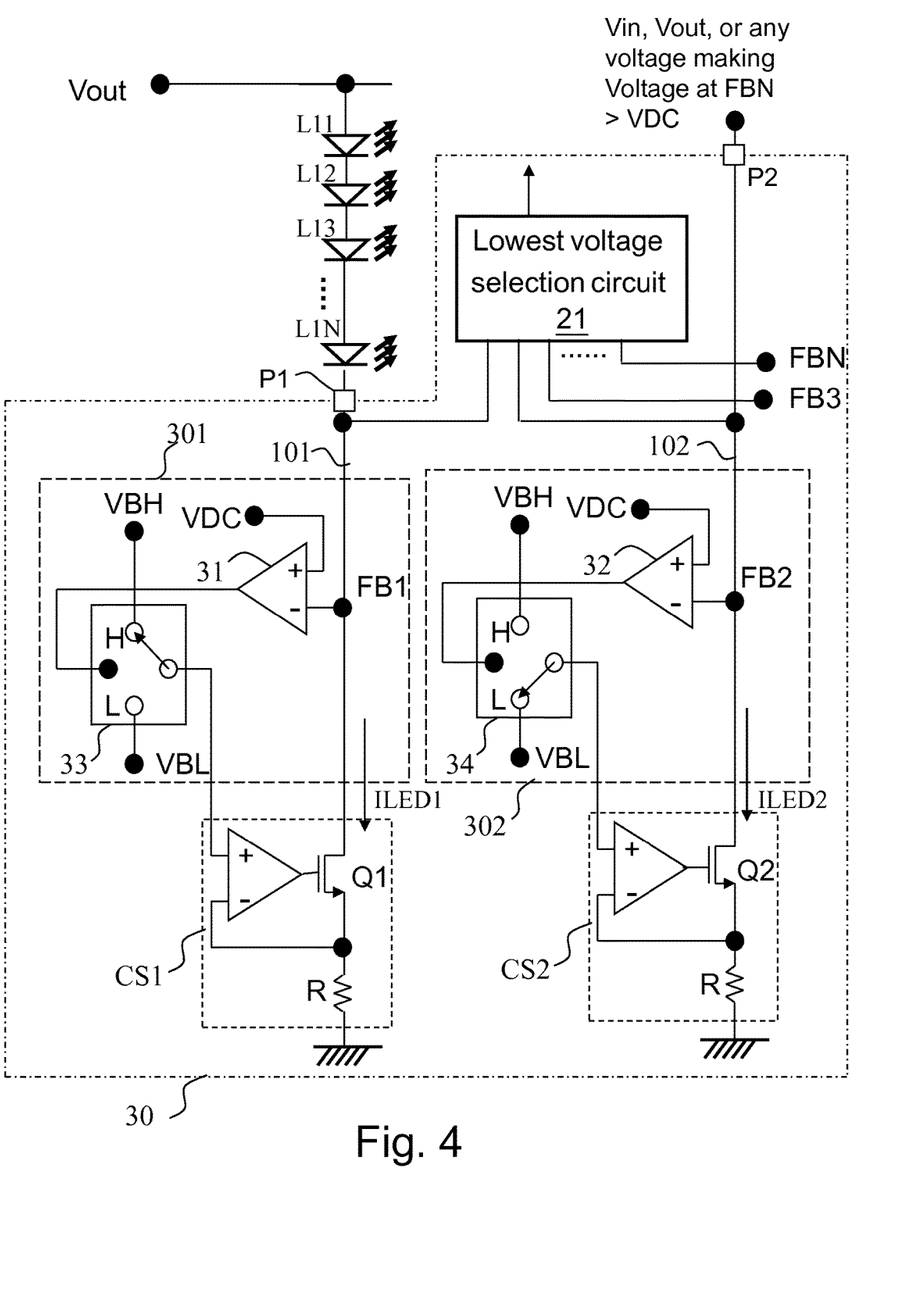
FIG. 4 is a schematic circuit diagram showing a backlight control circuit according to an embodiment of the present invention.

FIG. 4 is a schematic circuit diagram showing a backlight control circuit according to an embodiment of the present invention. For simplicity, the voltage supply circuit 11 and the error amplifying circuit 13 are omitted in the figure, and it only shows one LED path 101 which is in normal use and one LED path 102 which is not in use for contrast. However, in a real case, the number of the LED paths (indicated by N) may be more than two. The LED path 102 which is not in use may conveniently be electrically connected to the input voltage Vin, the output voltage Vout, or any feasible voltage higher than a certain requirement (to be explained later). In this embodiment it is directly connected to the input voltage Vin, and in most of the cases this is the most convenient arrangement. Note that the language "electrically connected" does not limit the connection to a direct connection; it also includes indirect connection through an interposed device or devices.

As shown in the figure, the backlight control circuit 30 comprises current source control circuits 301 and 302. More specifically, two comparator circuits 31 and 32 are provided in correspondence to the LED paths 101 and 102. They compare the voltages at nodes FB1 and FB2 with a predetermined reference voltage VDC, respectively. The voltage VDC should be designed within two values (A) and (B), (A)<VDC<(B):

(A) the voltage at the nodes FB1-FBN when the LED paths are in normal use (in normal operation);

(B) the voltages at the nodes FB1-FBN when the LED paths are connected to the input voltage Vin, the output voltage Vout, or any relatively higher reference voltage.

Referring to FIG. 4, since the LED path 101 is in normal operation, each LED L11-L1N on the LED path 101 creates a normal voltage drop, and therefore the voltage at the node FB1 (equal to the output voltage Vout minus the total voltage drop through LEDs L11-L1N) is lower than the reference voltage VDC. Thus, the output of the comparator circuit 31 is high, causing the selection circuit 33 to switch to the reference voltage VBH. On the contrary, since the LED path 102 is not in use and electrically connected to the input voltage Vin, the voltage at the node FB2 is equal to the voltage Vin, which is higher than the reference voltage VDC. Therefore the comparator circuit 32 outputs a signal "low", and the selection circuit 34 switches to the reference voltage VBL. The voltages VBH and VBL are the voltage references for controlling the currents of the current sources CS1 and CS2. In this embodiment, as the reference voltage of the current source CS1 is set to VBH, the current source CS1 will maintain the current ILED1 on the path 101 at a normal operating value (=VBH/R), e.g., between 5 and 25 mA. On the contrary, as the reference voltage of the current source CS2 is set to VBL, the current source CS2 will maintain the current ILED2 on the path 102 at a low or no power consumption state (=VBL/R), e.g., VBL=0 volt, so that the current ILED2 is equal to 0 ampere, and no power is consumed on the path 102.

In brief, the design concept of the foregoing circuit is thus: when an LED path is not in use, the corresponding pin (P2 in FIG. 4, for example) can be conveniently connected to any voltage higher than VDC. In addition to the flexibility provided, the circuit further automatically shuts down or reduces the path current to reduce power consumption to minimum.

During circuit initialization stage, the voltages at critical nodes might not have reached a stable level, or some other abnormal interference might occur, such that the LED paths in normal use misread or misjudge signals to choose the reference voltage VBL. When VBL is set to zero or a very low value, the corresponding transistors Q1-QN will be shut down or only very low current will pass therethrough. Since the corresponding path current through light emitting devices is zero or very low, the voltage drop across the light emitting devices is small, and the node voltages at FB1-FBN are accordingly higher than the voltage VDC, so that the comparator circuit may keep misreading and may be unable to set up current sources CS1-CSN correctly. Therefore, a more preferred embodiment is shown in FIG. 5, for better circuit control.

Figure 5:
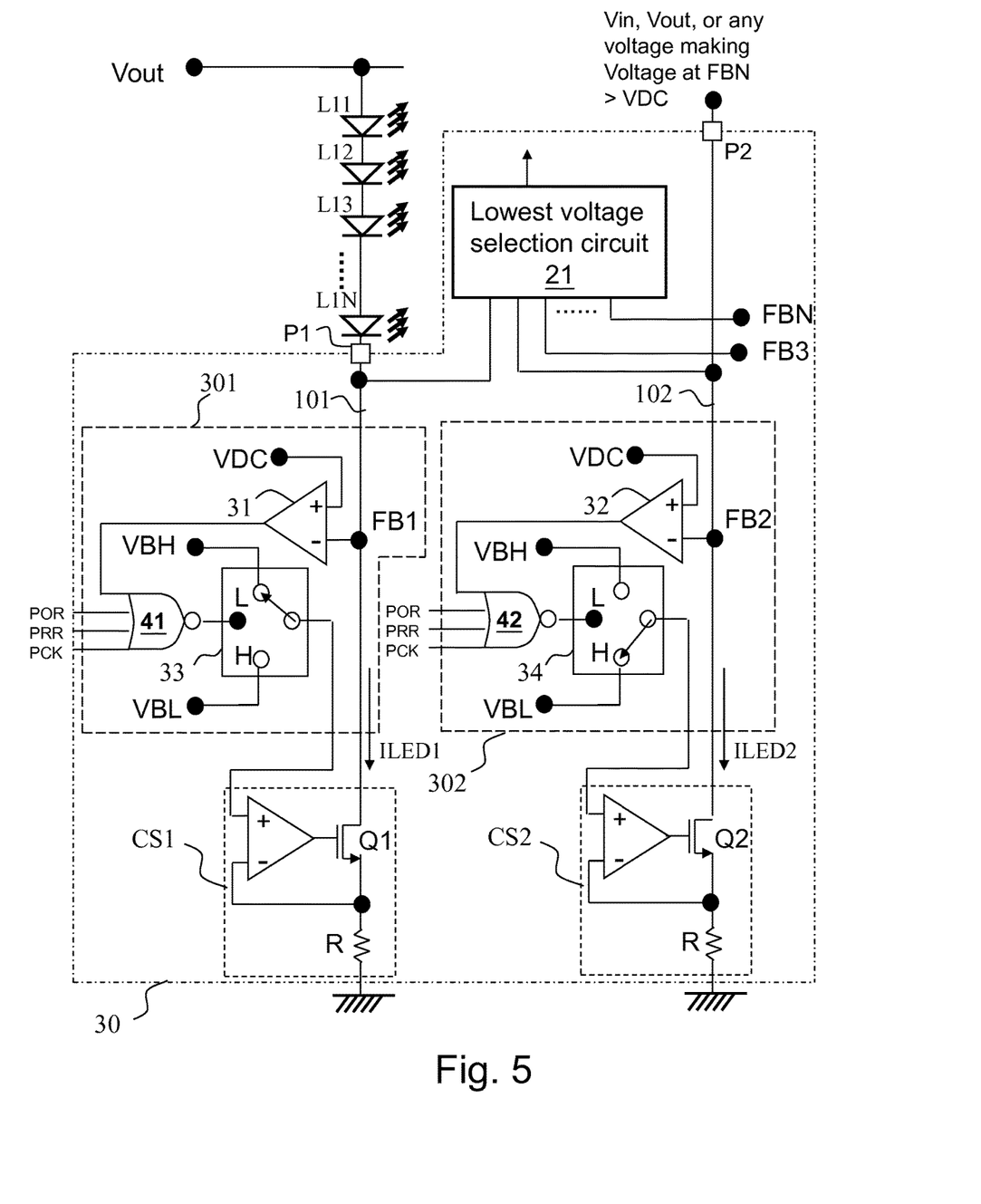
FIG. 5 is a schematic circuit diagram showing a backlight control circuit according to another embodiment of the present invention.

The embodiment of FIG. 5 further includes logic circuits 41 and 42, and the outputs from the comparators 31 and 32 are provided only as one of the inputs of the logic circuits 41 and 42. The logic circuits 41 and 42 are NOR gates which receive the outputs from the comparators 31 and 32 and one or more of the following signals, respectively: a power ON reset signal POR, a power recovery reset signal PRR, and a periodic check signal PCK. In the embodiment shown in FIG. 5, all of the above signals, plus the outputs from the comparator circuits 31 and 32 are transmitted to the logic circuits 41 and 42. Thus, referring to the logic circuit 41, the input signals must all be low for the selection circuit 33 to switch to the reference voltage VBL. On the other hand, during circuit initialization stage or during power recovery, either the signal POR or PRR is high, so the transistor Q1 in the current source CS1 will not be shut down even if the voltage at the node FB1 is higher than the voltage VDC. As for the signal PCK, in case a path is determined as "not in use", it can be arranged so that the signal PCK periodically causes the current source corresponding to the path to provide a normal current for a short period of time, for checking whether the path connection has been resumed. In summary of the above, it can be said that the outputs of the comparator circuits 31 and 32 are "shielded" by the signals POR, PRR, and PCK.

Note that the arrangement of the selection circuits 33 and 34 are different from those in the previous embodiment because the outputs of the logic circuits 41 and 42 are inversed (as compared with the previous embodiment).

Of course, in the above two embodiments, the high/low levels of the digital signals can be interchanged, as long as corresponding modifications are made to circuit. As an example, in the embodiment of FIG. 6, the positive and negative inputs of the comparators 31 and 32 are interchanged; the logic circuits 43 and 44 are OR gates; the reference voltage VBL is a low voltage but not equal to 0 volt (depending on the resistance of resister R, the reference voltage VBL may be set as, e.g., any value such that VBL/R is between 10 and 100 µA).

Figure 6:
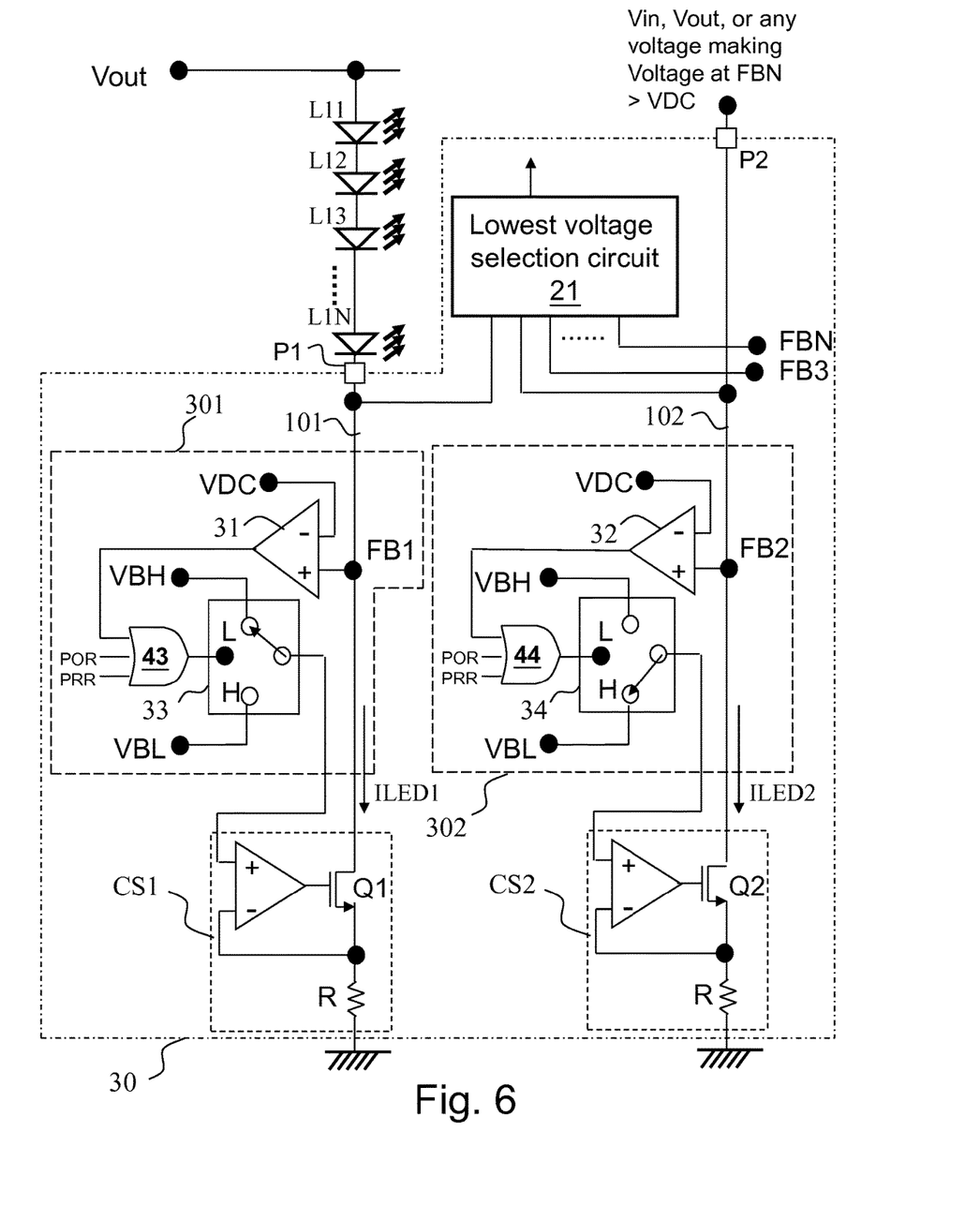
FIG. 6 is a schematic circuit diagram showing a backlight control circuit according to a further embodiment of the present invention.
Figure 7:
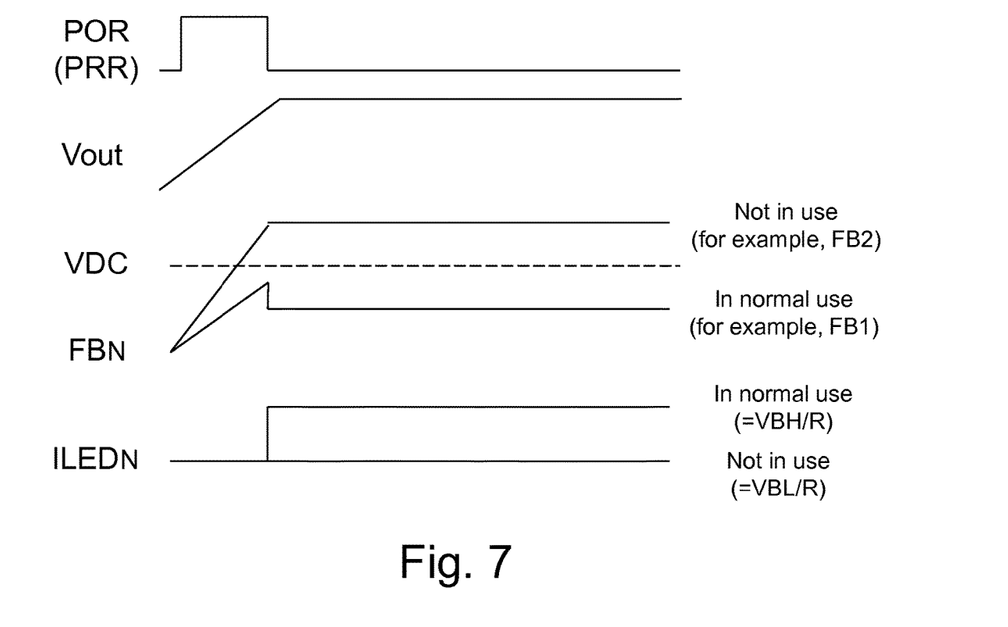
FIG. 7 is a diagram showing signal waveforms according to the embodiment shown in FIG. 6.

Referring to FIGS. 6 and 7, during circuit initialization stage or during power recovery, since the voltages at the nodes FB1, FB2 are lower than the reference voltage VDC, the outputs of the comparators 31 and 32 are low, but the signal POR or PRR is high, so the outputs of the logic circuits 43 and 44 are high, and the selection circuits 33 and 34 select the reference voltage VBL. (However, the voltage VBL is not equal to 0 volt, so the current sources CS1 and CS2 still provide low currents to pass through the paths 101 and 102). As the output voltage Vout rises, the voltage at the node FB1 correspondingly increases, but it will not exceed the reference voltage VDC (because the value VBL is set in such a manner that the total voltage across the LEDs is not insignificantly low). However, the voltage at the node FB2 exceeds the reference voltage VDC so that the output of the comparator 32 becomes high. When the signal POR or PRR ends, the output of the logic circuit 43 becomes low, and the selection circuit 33 switches to the reference voltage VBH. However, at the right side of FIG. 6, since the output of the comparator circuit 32 is high, the output of logic circuit 44 remains high, and the selection circuit 34 still chooses the reference voltage VBL.

In this embodiment, for accurate signal response, the duration when the signals POR and PRR are at high level could be longer than the duration of ordinary power ON reset signal and power recovery signal. However, there would be no concern about power consumption and heat because only very low amount of currents pass through the paths 101-10N. The required signals POR and PRR with a longer pulse width can be obtained from the ordinary power ON reset signal and power recovery reset signal by extending a period of time from the rising edge or falling edge thereof.

Figure 8:
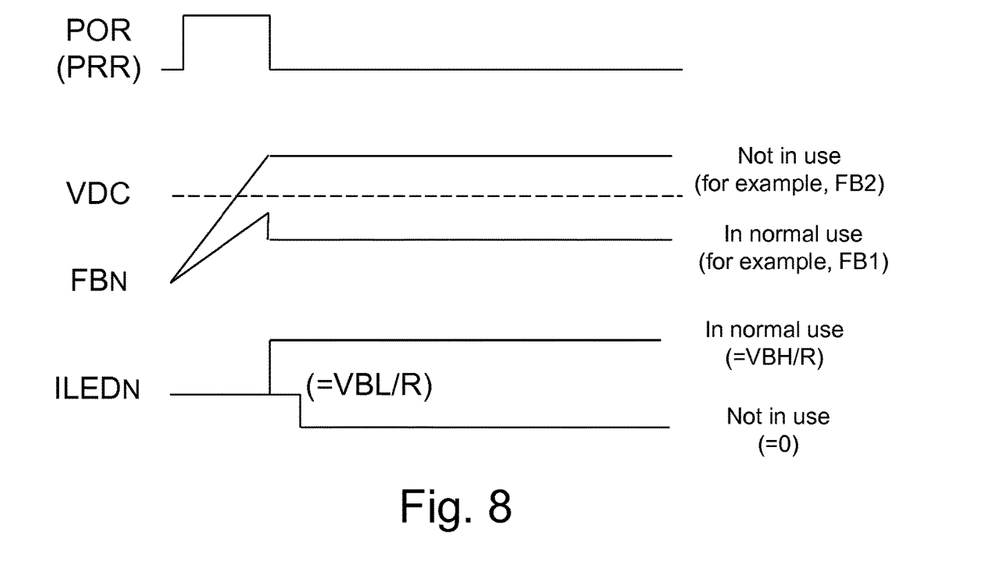
FIG. 8 explains that the reference voltage VBL can be arranged to include at least two steps.

In the arrangement of FIGS. 6 and 7, the reference voltage VBL is low but not equal to 0 volt, such that the comparators 31 and 32 can operate normally during circuit initialization stage or power recovery period. Thus, some very small current (ILEDN=VBL/R) remains flowing on the unused paths. In fact, after a path is found unused, the operation of a comparator corresponding to the path is no more important. Therefore as shown in FIG. 8, the reference voltage VBL can be designed to include two or more steps (phases): low but not equal to 0 volt during circuit initialization stage or power recovery period; and 0 volt for saving power after the operation situation of every path has been determined. There are many possible ways to set the reference voltage VBL to two or more phases. For example, the node of the reference voltage VBL may be grounded through a switch connected in parallel, and the switch is turned ON after a predetermined period or time following the end of the signal POR or PRR. Those skilled in this art can readily think of many variations to achieve the same effect under the teachings of the present invention.

In the present invention, the over voltage protection circuit 12 is not necessarily required. However, an over voltage protection circuit 12 can still be disposed in the backlight control circuit of the present invention.

The present invention has been described in considerable detail with reference to certain preferred embodiments thereof, which are for illustrative purpose but not for limiting the scope of the invention. Various other substitutions and modifications will occur to those skilled in the art, without departing from the spirit of the present invention. For example, in the embodiments the currents ILED1-ILEDN are controlled by two-level switching between the voltages VBH and VBL. There are various other methods to control the currents ILED1-ILEDN to achieve the same purpose, such as by varying the resistance of the resistor R (e.g., through series or parallel connection with another resistor), or by providing another current source connected in parallel with the current source as shown. As another example, one can insert a circuit which does not affect the primary meaning of its input signal, such as a delay circuit, between any two devices shown to be in direct connection in the embodiments. As yet another example, the definition of high/low level of signals inputted to or outputted from a digital device is not limited by what is shown in the forgoing embodiments; the signals can be inverted, as long as proper rearrangement is made to corresponding circuitry. Moreover, in the forgoing embodiments, the backlight control circuit is shown as one integrated circuit, but it can be divided into two or more integrated circuits or integrated with other circuit devices. Further, the present invention can be applied not only in the circuit with light emitting devices connected partially in series and partially in parallel, but also in the circuit with light emitting devices connected all in series or all in parallel. And, although the light emitting devices are shown to be LEDs, they can be other light emitting devices such as organic light emitting diodes. In addition, the so-called "backlight" in the backlight control circuit is not to be taken in a narrow sense that the circuit has to control the backlight of a screen; the present invention can be applied to "active light emission display", or "LED illuminator", or other apparatuses that employ light emitting devices. Therefore, all modifications and variations based on the spirit of the present invention should be interpreted to fall within the scope of the following claims and their equivalents.

What is claimed is:
1. A method of controlling current on a light emitting device path, comprising:
 (a) providing a light emitting device path including one or more light emitting devices connected in series;

(b) detecting the state of the light emitting device path according to a comparison between a node voltage on the light emitting device path and a predetermined reference voltage, wherein when the node voltage is lower than the predetermined reference voltage, it is determined that the light emitting device path is in a normal operation state wherein each light emitting device on the light emitting device path creates a normal voltage drop, and when the node voltage is higher than the predetermined reference voltage, it is determined that the light emitting device path is not in the normal operation state wherein the light emitting device path has a voltage drop lower than a total of the normal voltage drops;

(c) conducting a relatively high current on the light emitting device path in the normal operation state, and conducting a relatively low or no current on the light emitting device path when the light emitting device path is not in the normal operation state, such that when the light emitting device path is connected to a voltage level for supplying power to the light emitting device path but the light emitting device path has a voltage drop lower than a total of the normal voltage drops, there is only low or no current on the light emitting device path; and (d) after the light emitting device path has been determined not in the normal operation state, checking whether the light emitting device path resumes to the normal operation state by determining whether the node voltage is lower than the predetermined reference voltage.

2. The method of claim 1, wherein the step (b) further includes:
shielding the comparison of the step (b) under at least one of the following situations: circuit initialization, power recovery, and periodic check.

3. The method of claim 1, wherein the step (c) includes:
(c1) conducting a relatively low current on the light emitting device path when the state of the light emitting device path is not determined;
(c2) conducting a relatively high current on the light emitting device path when the light emitting device path is in the normal operation state; and
(c3) conducting a relatively low or no current on the light emitting device path when the light emitting device path is not in the normal operation state.

4. The method of claim 3, wherein the step (c3) includes: first conducting a relatively low current on the light emitting device path, and then conducting no current on the light emitting device path.

5. The method of claim 1, wherein the current amount on the light emitting device path is controlled by a current source, and the step (c) includes: changing the current amount of the current source according to a result of the step (b).

6. The method of claim 5, wherein the current amount is set by the current source according to a reference voltage, and the reference voltage is changeable between two values.

7. The method of claim 1, wherein the light emitting device path is disposed inside a circuit, and the method further includes: electrically connecting an end of the light emitting device path to one of the followings: an input voltage of the circuit, an output voltage of the circuit, and a predetermined reference voltage, when the light emitting device path is not in use.

8. A backlight control circuit, comprising:
a light emitting device path including one or more light emitting devices connected in series;
a current source, controlling a current amount on the light emitting device path, wherein the current source provides a relatively high current when the current source is in a first state, and provides a relatively low current when the current source is in a second state; and
a current source control circuit, setting the current source to the first state wherein the current source provides a relatively high current after the light emitting device path is determined in normal operation wherein a node voltage on the light emitting device path is lower than a predetermined reference voltage and wherein each light emitting device on the light emitting device path creates a normal voltage drop, and setting the current source to the second state wherein the current source provides a relatively low current after the light emitting device path is determined not in normal operation wherein the node voltage on the light emitting device path is higher than the predetermined reference voltage and wherein the light emitting device path has a voltage drop lower than a total of the normal voltage drops, such that when the light emitting device path is connected to a voltage level for supplying power to the light emitting device path but the light emitting device path has a voltage drop lower than a total of the normal voltage drops, there is only low or no current on the light emitting device path.

9. The backlight control circuit of claim 8, wherein the current source control circuit comprises:
a comparator circuit, providing an output signal according to the node voltage on the light emitting device path; and
a selection circuit, setting the state of the current source according to the output signal of the comparator circuit.

10. The backlight control circuit of claim 8, wherein the current source control circuit comprises:
a comparator circuit, providing an output signal according to the node voltage on the light emitting device path;
a logic circuit, receiving the output signal of the comparator circuit, and at least one of following signals: a power ON reset signal, a power recovery reset signal, and a periodical check signal; and
a selection circuit, setting the state of the current source according to an output signal of the logic circuit.

11. The backlight control circuit of claim 8, wherein the relatively low current is equal to 0 ampere.

12. The backlight control circuit of claim 8, wherein the relatively low current is higher than 0 ampere.

13. The backlight control circuit of claim 8, wherein the relatively low current is variable and includes at least two phases: a first phase, being not equal to 0 ampere; and a second phase, being equal to 0 ampere.

14. The backlight control circuit of claim 8, wherein an end of the light emitting device path is electrically connected to one of the followings: an input voltage of backlight control circuit, an output voltage of backlight control circuit, and a predetermined reference voltage, when the light emitting device path is not in use.

* * * * *